Feb. 6, 1962   F. R. J. FOWLER   3,019,875
VARIABLE SPEED DRIVE MECHANISM
Filed June 16, 1959

INVENTOR.
F. Robert J. Fowler
BY
R. L. Spencer
ATTORNEY

United States Patent Office 3,019,875
Patented Feb. 6, 1962

3,019,875
VARIABLE SPEED DRIVE MECHANISM
F. Robert J. Fowler, Flint, Mich., assignor to General Motors Corporation, Detroit, Mich., a corporation of Delaware
Filed June 16, 1959, Ser. No. 820,683
12 Claims. (Cl. 192—58)

This invention relates to improvements in variable speed drive mechanisms and is particularly adapted for use in a fan drive for an automotive vehicle.

Several types of variable speed fan drives have heretofore been proposed for use in automotive vehicles. These arrangements have generally been of complicated structure, expensive to manufacture and maintain, noisy and have rough engagement characteristics when the fan drive is being engaged.

An object of this invention is to provide a variable speed drive unit which is of simple construction and economical to manufacture and assemble.

Another object of this invention is to provide a fan drive unit adapted to drive a fan at variable speeds, the fan speed being controlled in accordance with cooling requirements.

A further object of this invention is to provide a fan drive unit incorporating an engine driven impeller, a sealed chamber partially filled with working fluid, and incorporating temperature responsive means for varying the volume of the chamber to vary the torque transmitting capacity of the unit.

An additional object of this invention is to provide a variable speed drive unit wherein the driven member is rotatably supported directly upon a drive shaft and incorporating a chamber partially filled with working fluid and enclosing an impeller, wherein one portion of the chamber may be moved axially with respect to the impeller to vary the torque transmitting capacity of the unit.

Another object of this invention is to provide a variable speed fan drive unit including an axially movable portion cooperating with a fan hub to provide a sealed chamber partially filled with working fluid and enclosing an impeller wherein in one position of the axially movable portion the impeller is effective to throw the working fluid into the outer radial zone of the sealed chamber to prevent drive of the fan by the impeller.

A further object of this invention is to provide in a drive unit of the type described, a temperature responsive power unit for controlling the quantity of working fluid in contact with the impeller to vary the fan speed in accordance with cooling requirements.

A more particular object of this invention is to provide a fan drive of the type described incorporating automatically operating means for preventing overloading of a diaphragm protecting member when maximum torque transmission is required.

Another object of this invention is to provide a variable speed fan drive of the type described wherein the cover functions not only as a means for protecting the diaphragm and the assembly secured to the diaphragm against dirt and other foreign matter, but also serves as a retaining means for securing a rim of the diaphragm to the driven member and to slidably support the temperature responsive power element of the assembly.

These and other objects of the invention will be apparent from the following description and claims, taken in conjunction with the following drawings in which:

Figure 1:
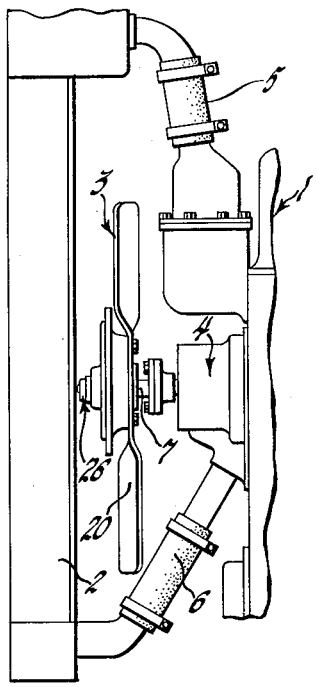
FIGURE 1 is a fragmentary side elevation of an engine equipped with a fan drive unit constructed in accordance with the principles of this invention.

Referring to FIGURE 1, there is shown schematically a vehicle engine indicated generally at 1, a radiator 2, and a fan unit indicated generally at 3. Fan unit 3 is mounted upon the end of a drive shaft 7 for a water pump indicated generally at 4. Radiator 2 is connected at its inlet to engine 1 by means of a flexible hose 5 and to a coolant water pump 4 by means of a flexible hose 6. By mounting the fan directly upon the water pump drive shaft 7, the need for a fan pulley and the cost thereof is eliminated.

Figure 2:
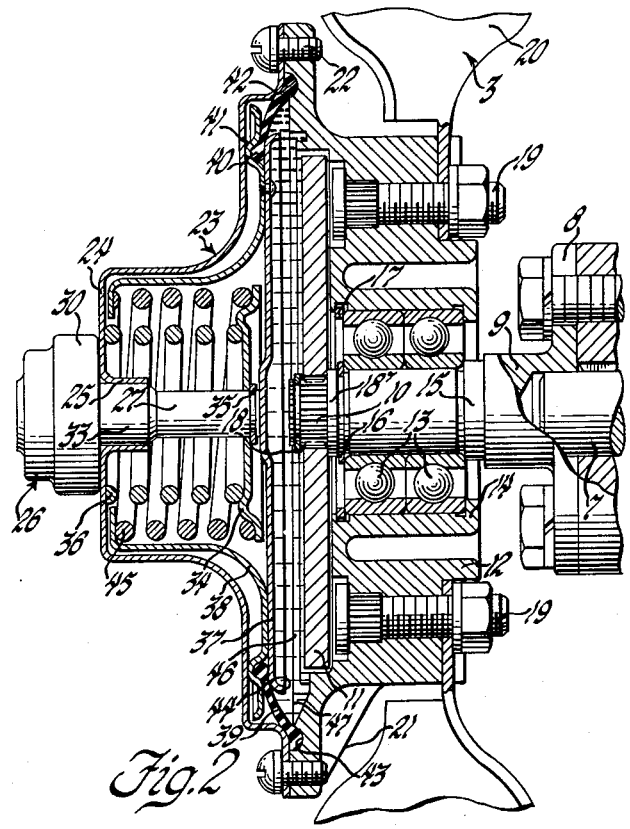
FIGURE 2 is a partially sectional view of a fan drive unit assembly.

Referring particularly to FIGURE 2, a mounting flange 8 is fixed to one end of an impeller drive shaft 9 having splines 10 for receiving an impeller 11. Flange 8 provides a rigid support for the fan unit, which is mounted directly upon a power input shaft such as water pump shaft 7. A fan hub body 12 is rotatably supported upon impeller drive shaft 9 by means of a pair of ball bearings 13, the bearings 13 being positioned directly beneath the fan blades 20 to provide for maximum rigid support of the rotating portion of the assembly. Bearings 13 are retained in place by means of a flange 14 on body 12 and a shoulder 15 on shaft 9 at one side of the bearings and by means of a pair of retaining rings 16 and 17 at the opposite side of the bearings. Impeller 11 is a cylindrical disc having a central splined opening, the splines of which mate with splines 10 on shaft 9 in assembled relationship. A snap ring 18 retains disc 11 on shaft 9, the disc being held between a shoulder 18′ on shaft 9 and snap ring 18. Fan hub 12 is drilled to receive fan blade mounting studs 19 whereby the fan blades 20 are mounted upon the hub 12. While only a pair of mounting studs 19 are shown in FIGURE 2, it will be understood that four equally spaced studs are used in the assembly, there being one stud for each fan blade. Hub 12 is also provided with a plurality of equally spaced cooling ribs 21 to dissipate heat.

Figure 3:
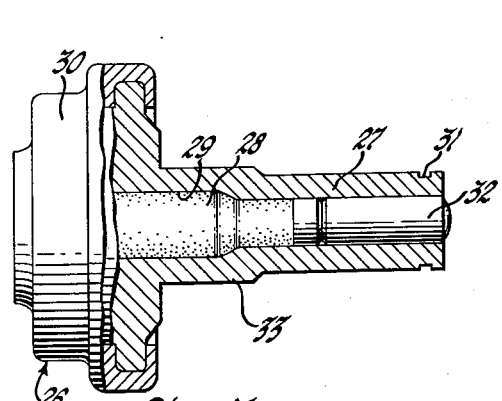
FIGURE 3 is an enlarged partially sectional view of a temperature responsive power element used to control the speed of rotation of the fan in accordance with changes in cooling requirements.
Figure 4:
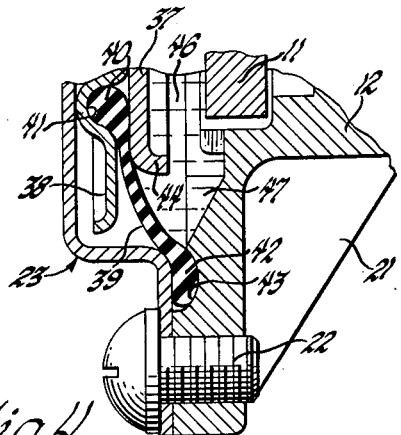
FIGURE 4 is an enlarged sectional view of the outer portion of the fan drive assembly illustrating the flexible diaphragm and its attachment to the fan hub and the sub-assembly including the diaphragm actuator and diaphragm protector.

Secured to fan hub 12 by means of a plurality of equally spaced screws 22 is a cover 23, the cover 23 having an axially extending annular boss 25 formed perpendicular to a radially extending flange portion 24. The axially extending hollow boss 25 serves to support a thermostatic actuating element 26 in the assembly. As shown in FIGURE 3, the temperature responsive power element 26 is composed of a tubular portion 27 drilled to receive a piston 32 freely movable within the bore of tubular case 27, there being a rubber plug indicated at 28 disposed in bore 29 and movable by a temperature responsive expansible and contractable material disposed in head 30. The thermostatic power element 26 per se is of a well known type. The manner in which the power element is mounted in the assembly, however, is believed novel. The power element includes a head portion 30 of greater diameter than tubular portion 27, and a groove 31 adapted to receive a snap ring for purposes hereafter more fully explained.

Referring further to FIGURE 2, power element 26 is shown assembled to cover 23. Head 30 contacts the outer surface of flange 24 of cover 23. An enlarged cylindrical section 33 of tubular portion 27 contacts the annular bore formed by boss 25. A spring seat 34 is retained on power element case 26 by means of a snap ring 35 disposed in groove 31 of case 27. A spring 36 seated upon spring seat 34 and upon the inner surface of flange 24 opposite head portion 30 biases the power element to the right as shown in FIGURE 2, so that the head 30 snugly seats upon the outer surface of flange 24. Spring 36 serves an additional function to that of holding the power element 26 in the assembly as hereafter more fully explained.

Disposed within the chamber enclosed by cover 23 and fan hub 12 is a movable assembly composed of a diaphragm protector 37 and a diaphragm control member 38. These two members are riveted together to form an assembly adapted to be moved axially toward and away from impeller 11. A flexible diaphragm 39 shaped to form a flexible annular ring is provided with an enlarged rim 40 held with a stamped recess 41 formed in diaphragm control member 38, the rim 40 being held in recess 41 by means of diaphragm protector 37 when assembled. The opposite rim 42 of diaphragm 39 is enlarged and disposed in an annular groove 43 in body 12, the rim 42 being retained in groove 43 by means of cover 23 when the cover is assembled to body 12. An annular flange 44 is bent at ninety degrees to the main portion of diaphragm protector 37 at the outer periphery of the protector to limit the permissible axial movement of the assembly to the right as viewed in FIGURE 2. A spring 45 seated upon spring seat 34 and upon diaphragm control member 38 yieldably biases the diaphragm toward the left as viewed in FIGURE 2. Diaphragm protector 37 at its center contacts piston 32 of the thermostatic actuating unit.

The assembly of the diaphragm 39, diaphragm protector 37, diaphragm control member 38, and fan hub body 12 enclose a chamber 46 in which impeller 11 is disposed. The diaphragm control spring 45, seated upon spring seat 34 and diaphragm control member 38, yieldably biases the axially movable assembly including members 37 and 38 and diaphragm 39 to the left as viewed in FIGURE 2. A limited quantity of working fluid such as oil is disposed in chamber 46 such that with the parts in the position illustrated all of the working fluid may be retained in a chamber portion 47 radially outwardly from impeller 11 such that impeller 11 is prevented from transmitting torque to fan hub 12.

In operation, considering the vehicle engine to be cold, spring 45, acting upon diaphragm control member 38 moves diaphragm 39 and diaphragm protector 37 to the left, as shown in FIGURE 2. Diaphragm protector 37 contacts the end of piston 32 to bias the piston to the left and into casing 27. Disc impeller 11 is continuously driven by the engine and throws the working fluid radially outwardly into chamber 47. In this condition of operation the impeller 11 is unable to drive fan hub 12. Assuming that the engine warms up, the water temperature in radiator 2 rises and warms up the air flowing through the radiator, this air in turn passing over the temperature responsive actuating element 26 heats up the element to cause piston 32 to move to the right, thereby moving the assembly including diaphragm protector 37, diaphragm control member 38, and one end of diaphragm 39 to the right. Spring 45 will be compressed as the power element is actuated. Movement of the diaphragm 39 to the right decreases the volume of chamber 47, thereby forcing the working fluid radially inwardly into contact with disc impeller 11. The impeller becomes increasingly capable of transmitting torque to the fan hub 12, depending upon the position of diaphragm 39. The effectiveness of torque transmittal is progressive, depending upon the demands for cooling. In the event that cooling is not called for, the fan hub simply free wheels. As the demand for cooling increases, fluid from chamber 47 is progressively displaced into contact with impeller 11 as the diaphragm assembly is moved to the right to reduce the volume of chamber 47 and chamber 46.

Spring 36, in addition to retaining the power element in its assembled position serves as an overtravel device to protect the movable diaphragm assembly against damage in the event of overheating. In the event that the annular axially protruding rim 44 of diaphragm protector 37 has moved to contact fan hub 12, and thermal unit 26 exerts an undue force upon member 37 due to a continued temperature rise, casing 27 and head 30 will simply move to the left and compress springs 36 and 45. In this manner, damage to the assembly is prevented in cases of excessive temperature rise.

The drive assembly permits the fan speed to be automatically varied in accordance with need for cooling, thereby reducing power consumption and fan noise. By providing a power element responsive to air temperature rather than water temperature, the fan drive may be used with either air cooled or water cooled engines without modification. The drive assembly is of a very compact design, eliminatees the need for fan drive pulleys and belts, and is economical to manufacture. The assembly provides a sealed chamber of variable capacity obtaining a limited quantity of working fluid wherein the fan speed is varied by varying the chamber volume. In one condition of operation, the volume of the chamber is such as to permit all of the working fluid to be thrown out of contact with the impeller. In another condition of operation, the fluid is retained in contact with the impeller. Between these two extremes a variable quantity of working fluid depending upon the axial position of the diaphragm and diaphragm protector with respect to the impeller is disposed in contact with the impeller to provide fan drive at variable speeds as called for by cooling requirements.

Cover 23, diaphragm protector 37, diaphragm actuator 38 are made of sheet metal stampings. Impeller 11, which is a simple disc, may also be a stamped part. The arrangement whereby the power element is supported in the boss 25 of cover 23 provides for axial motion of the power element body in a direction away from the impeller when diaphragm protector 37 has been moved axially toward the impeller 11 to the limit of its permissible range of movement. It will be noted that protector 37 is provided with an axially extruding annular rim 44 ground its periphery. Rim 44 contacts fan hub 12 when the power element piston 32 is effective to call for maximum fan speed. In the event that piston 32 exerts sufficient force on diaphragm protector 37 when rim 44 by virtue of its contact with fan hub 12 prevents further motion of the diaphragm protector, power element body 27 will move to the left as viewed in FIGURE 2 and further compress springs 36 and 45. This prevents overloading of diaphragm protector 37.

It is, of course, understood that impeller 11 rotates at all times when the engine is running. If power element 26 is cold, spring 45 will bias the assembly comprising diaphragm protector 37, diaphragm actuator 38 and diaphragm 39 to the left to permit impeller 11 to throw the working fluid radially outwardly into pocket 47. In this condition of operation, impeller 11 is unable to transmit torque to hub 12, and the fan idles. As the engine heats up, the air temperature exterior of cover 23 rises to heat up the power element 26. Piston 32, acting upon diaphragm protector 37 moves the assembly to the right such that part of the working fluid in pocket 47 is displaced radially inwardly into contact with impeller 11. The torque transferred to fan hub 12 depends upon the axial position of the assembly, which in turn is controlled by power element 26 in response to cooling requirements. The action is progressive and provides an infinely variable speed ratio drive of fan 20. The pick up of the load by the fan hub is smooth and without any shock loading. It will be understood that the fan is driven only at a speed required to satisfy cooling requirements with consequent savings in power consumption and reduced fan noise. By positioning the bearings 13 directly beneath the fan blades 20, a rigid support for fan hub 12 is provided. By rotatably supporting the fan hub directly upon the drive shaft, the need for fan pulleys and belts is eliminated. The arrangement is very compact and economical to manufacture and service. By positioning the power element 26 on cover 23 behind the radiator, as shown in FIGURE 1, the need for any direct connection into the engine water cooling system is eliminated. The assembly may therefore be used in connection wtih both air cooled and water cooled engines, and on air conditioned cars.

In order to make possible the use of a smaller power element, a limited quantity of fluid may be introduced into enclosed chamber between cover 23 and diaphragm 39 to partially counterbalance the centrifugal pressure developed by impeller 11 and normally working against the diaphragm assembly in chamber 47. In this event, an opposing centrifugal pressure to that in chamber 47 will make possible the use of a smaller temperature responsive power element.

What is claimed is:

1. A variable speed drive mechanism including a drive shaft, an impeller driven by said drive shaft, a driven member rotatably supported upon said drive shaft, a movable wall carried by said driven member and forming therewith a chamber enclosing said impeller, said chamber having an outer portion thereof extending radially outwardly beyond the outer periphery of said impeller and an inner portion positioned axially adjacent said impeller, working fluid in said chamber, said movable wall being movable with respect to said impeller to vary the quantity of working fluid in contact with said impeller, and automatically operable means for varying the position of said wall with respect to said impeller including a temperature responsive power element effective to move said wall toward said impeller upon a rise in temperature, said movable wall being effective upon movement thereof toward said impeller to force working fluid out of said outer portion of said chamber into the inner portion of said chamber to increase the quantity of working fluid in contact with said impeller.

2. A variable speed drive mechanism including a drive shaft, an impeller driven by said drive shaft, a driven member rotatably supported upon said drive shaft, means carried by said driven member and forming therewith a chamber enclosing said impeller, said means comprising an annular flexible diaphragm having one rim thereof secured to said driven member and another rim thereof secured to a diaphragm actuator, working fluid in said chamber, said diaphragm being movable with respect to said impeller to vary the quantity of working fluid in contact with said impeller, and automatically operable means for varying the position of said diaphragm actuator including a temperature responsive power element effective to move said diaphragm actuator toward said impeller upon a rise in temperature.

3. A variable speed drive mechanism including a drive shaft, an impeller driven by said drive shaft, a driven member rotatably supported upon said drive shaft, a cover fixed to said driven member for rotation therewith, means carried by said driven member disposed between said driven member and said cover and forming with said driven member a chamber enclosing said impeller, said means including an annular flexible diaphragm having one rim retained in assembled position by said driven member and said cover and another rim fixed to a diaphragm actuating mechanism, working fluid in said chamber, said diaphragm being movable with respect to said impeller to vary the quantity of working fluid in contact with said impeller, and automatically operable means for varrying the position of said diaphragm actuating mechanism including a temperature resonsive power element supported upon said cover and effective to move said diaphragm actuating mechanism toward said impeller upon a rise in temperature.

4. A variable speed drive mechanism including a drive shaft, an impeller driven by said drive shaft, a driven member rotatably supported upon said drive shaft, a cover fixed to said driven member for rotation therewith, means carried by said driven member disposed between said driven member and said cover and forming with said driven member a chamber enclosing said impeller, said means including an annular flexible diaphragm having one rim retained in assembled position by said driven member and said cover and another rim fixed to a diaphragm actuating mechanism, working fluid in said chamber, said diaphragm being movable with respect to said impeller to vary the quantity of working fluid in contact with said impeller, a temperature responsive power element carried by said cover, effective upon a rise in temperature to move said diaphragm toward said impeller, and spring means for opposing the action of said power element.

5. A variable speed drive mechanism including a drive shaft, an impeller driven by said drive shaft, a driven member rotatably supported upon said drive shaft, a cover fixed to said driven member for rotation therewith, an annular diaphragm having a rim thereof retained between said cover and said driven member, a movable assembly secured to a second rim of said diaphragm, said assembly comprising a diaphragm protecting member and a diaphragm actuating member, said movable assembly, said diaphragm, and said driven member forming a chamber enclosing said impeller, working fluid in said chamber, a temperature responsive power element operatively associated with said movable assembly, said power element being operative upon said movable assembly in response to temperature rise to move said assembly toward said impeller to force working fluid into contact with said impeller, and spring means yieldably opposing the action of said power element, said spring means being effective upon a drop in temperature of said power element to move said assembly away from said impeller whereby working fluid is permitted to move out of contact with said impeller.

6. A variable speed drive mechanism including a drive shaft, an impeller driven by said drive shaft, a driven member rotatably supported upon said drive shaft, a cover fixed to said driven member for rotation therewith, an annular diaphragm having one rim thereof retained between said cover and said driven member, a movable assembly secured to a second rim of said diaphragm, said assembly comprising a diaphragm protecting member and a diaphragm actuating member secured to each other, said assembly, diaphragm, and said driven member forming a chamber enclosing said impeller, working fluid in said chamber, a temperature responsive power element supported upon said cover and having a movable member in contact with said diaphragm protecting member, said last-mentioned movable member being movable in response to temperature rise of said power element to move said assembly and diaphragm toward said impeller to force working fluid into contact with said impeller, and spring means opposing the action of said power element, said spring means being effective upon a drop in temperature of said power element to move said assembly and diaphragm away from said impeller whereby working fluid is permitted to move out of contact with said impeller.

7. A variable speed drive mechanism including a drive shaft, an impeller driven by said drive shaft, a driven member rotatably supported upon said drive shaft, a cover fixed to said driven member for rotation therewith, an annular diaphragm having one rim thereof secured to said driven member and a second rim thereof secured to a movable assembly, said movable assembly comprising a diaphragm protector member and a diaphragm actuating member secured to each other, said movable assembly, diaphragm, and driven member forming a chamber enclosing said impeller, working fluid in said chamber, a temperature responsive power element supported upon said cover and extending through said cover, a spring seat carried by said power element, a spring seated upon said spring seat and effective upon said diaphragm actuating element to yieldably bias said assembly to move said assembly axially away from said impeller, said power element including a piston in contact with said diaphragm protector and effective upon a rise of temperature of said power element to move said assembly axially toward said impeller in opposition to the action of said spring.

8. A variable speed drive mechanism including a drive shaft, an impeller driven by said drive shaft, a driven member rotatably supported upon said drive shaft, a cover fixed to said driven member for rotation therewith, an annular diaphragm having one rim fixed to said driven member and a second rim secured to a movable assembly, said movable assembly comprising a diaphragm actuating member and a diaphragm protector fixed to each other, said driven member, diaphragm, and assembly forming a chamber enclosing said impeller, working fluid in said chamber, a temperature responsive power element supported upon said cover and extending through said cover, a spring seat carried by said power element, a first spring having one end seated upon said spring seat and another end seated upon said diaphragm actuating element and effective upon said diaphragm actuating element to yieldably bias said assembly to move said assembly away from said impeller, said power element including a piston in contact with said diaphragm protector and effective upon a rise in temperature of said power element to move said assembly axially toward said impeller in opposition to said first spring, and a second spring having one end seated upon said spring seat and a second end seated upon said cover, said second spring being effective to permit movement of said power element axially away from said diaphragm protector when said diaphragm protector has been moved to its permissible limit of travel in a direction axially toward said impeller.

9. A variable speed drive mechanism including a drive shaft, a driven member, a bearing rotatably supporting said driven member upon said drive shaft, an impeller comprising a disc fixed to said drive shaft for rotation therewith, a cover comprising a sheet metal stamping fixed to said driven member, an axially extending boss formed on said cover, an annular diaphragm having one rim thereof retained to said driven member by said cover, a movable assembly disposed between said driven member and said cover, said movable assembly comprising a diaphragm protector and a diaphragm actuating member fixed to each other, said diaphragm having a second rim thereof clamped between said diaphragm protector and said diaphragm actuator and forming with said movable assembly and said driven member a chamber enclosing said impeller, working fluid in said chamber, a temperature responsive power element having an enlarged head portion contacting the outer surface of said cover and a body portion extending through said boss and supported by said boss, a spring seat supported upon said body, said power element including a piston in contact with said diaphragm protector, a first spring having one end seated upon said diaphragm actuating member, said spring being effective to yieldably bias said assembly for axial movement away from said impeller, said power element having a piston contacting said diaphragm protector and effective upon a rise in temperature of said power element to move said assembly axially toward said impeller in opposition to said first spring, a second spring having one end seated upon said spring seat and a second end seated upon said cover, said second spring being effective to permit movement of the body of said power element axially away from said diaphragm protector when said diaphragm protector has been moved to its permissible limit of travel in a direction axially toward said impeller.

10. A variable speed fan drive comprising in combination, an engine driven drive shaft, a fan hub having fan blades fixed thereto, bearing means disposed between said hub and shaft for rotatably supporting said hub on said shaft, an impeller carried by said shaft for rotation therewith, an annular diaphragm having one rim fixed to said fan hub and a second rim fixed to a movable assembly, said movable assembly, diaphragm and fan hub forming a chamber enclosing said impeller working fluid disposed in said chamber and partially filling the same, spring means yieldably biasing said assembly in a direction axially away from said impeller, and a temperature responsive power element effective upon a rise in temperature to bias said assembly in a direction axially toward said impeller in opposition to said spring means.

11. A variable speed fan drive comprising in combination, an engine driven drive shaft, a fan hub having fan blades fixed thereto rotatably supported upon said drive shaft, an impeller fixed to said drive shaft for rotation therewith, an annular diaphragm, a cover enclosing said diaphragm, said cover providing means for clamping a rim of said diaphragm to said fan hub, a movable assembly comprising a diaphragm actuating member and a diaphragm protector disposed within said cover and clamped to a second rim of said diaphragm, said movable assembly, diaphragm and fan hub forming a chamber enclosing said diaphgram, working fluid disposed in said chamber and partially filling the same, a temperature responsive power element having a body supported upon said cover and extending through said cover, spring means carried by said body and effective upon said diaphragm actuating member to bias said assembly for axial motion away from said impeller, said power element having a piston contacting said diaphragm protector and effective to move said assembly in a direction axially toward said impeller upon a rise in temperature of said power element.

12. A variable speed fan drive comprising in combination, an engine driven shaft, a fan hub having fan blades secured thereto, an impeller fixed to said drive shaft for rotation therewith, an annular diaphragm, a cover enclosing said diaphragm and providing means for clamping a rim of said diaphragm to said fan hub, a movable assembly disposed within said cover comprising a diaphragm protector and a diaphragm actuating member secured to each other and to a second rim of said diaphragm, said assembly, diaphragm and fan hub forming a chamber enclosing said impeller, working fluid partially filling said chamber, a temperature responsive power element having a body supported upon said cover and extending through said cover, a piston in said body in contact with said diaphragm protector, a spring seat carried by said body, a first spring positioned between said spring seat and said diaphragm actuating member effective to yieldably bias said assembly for axial motion away from said impeller, said piston being effective to bias said assembly for axial motion toward said impeller upon a rise in temperature of said power element, and a second spring positioned between said spring seat and said cover, said second spring being normally effective to bias said power element body for axial motion toward said impeller and to permit axial motion of said power element body away from said impeller when said diaphragm protector has been moved to its limit of travel in a direction toward said impeller.

References Cited in the file of this patent
UNITED STATES PATENTS

| | | |
|---|---|---|
| 2,516,269 | Starkey | July 25, 1950 |
| 2,633,697 | Johnson | Apr. 7, 1953 |
| 2,706,468 | Willcox | Apr. 19, 1955 |
| 2,725,185 | Willcox | Nov. 29, 1955 |
| 2,786,456 | Heiss | Mar. 26, 1957 |
| 2,840,315 | Heiss | June 24, 1958 |